Figure 1:
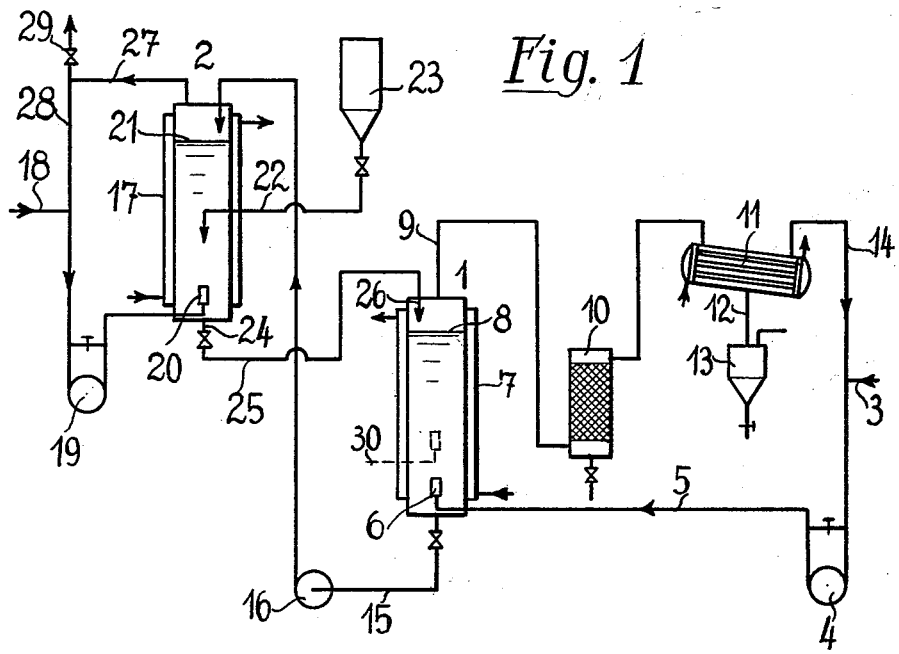

Feb. 26, 1963 A. JACOBOWSKY ETAL 3,079,444
METHOD OF PREPARING HALOGEN-SUBSTITUTED
ALIPHATIC HYDROCARBONS
Filed Dec. 1, 1958

INVENTORS
ARMIN JACOBOWSKY AND
KURT SENNEWALD

BY Connolly and Hutz

THEIR ATTORNEYS

United States Patent Office 3,079,444
Patented Feb. 26, 1963

3,079,444
METHOD OF PREPARING HALOGEN-SUBSTITUTED ALIPHATIC HYDROCARBONS
Armin Jacobowsky, Knapsack, Bezirk Koln, and Kurt Sennewald, Knapsack, near Koln, Germany, assignors to Knapsack-Griesheim Aktiengesellschaft, Knapsack, near Koln, Germany, a corporation of Germany
Filed Dec. 1, 1958, Ser. No. 777,510
Claims priority, application Germany Dec. 27, 1957
8 Claims. (Cl. 260—654)

The present invention relates to a method of preparing halogen-substituted aliphatic hydrocarbons and is a continuation-in-part of U.S. patent application Serial No. 359,366 filed June 3, 1953 (now abandoned). U.S. Patent No. 1,811,959 describes a process of preparing polymerization products of acetylene or vinyl halides by contacting acetylene with a catalyst, which consists of cuprous chloride, in the presence of ammonium chloride or a tertiary amine and hydrochloric acid. As is known, cuprous chloride may also be replaced by a mixture of cupric chloride and copper.

It could not be foretold, but it was a surprising fact that by the use of cupric catalysts, but without the simultaneous use of metallic copper and ammonium chloride, the reaction of the acetylene could be conducted in such a way that other products would be produced nearly quantitatively.

The present invention relates to a process of preparing halogen-substituted aliphatic hydrocarbons from unsaturated hydrocarbons having a triple bond and cupric halides in the corresponding hydrohalic acid solution. It is thus possible, for example to pass acetylene through a cupric-salt solution of hydrohalic acid, so that trans 1,2 dihalide ethylene is obtained in a high purity and the cupric-salt is quantitatively reduced to cuprous-salt. This reaction, for example the conversion into trans 1,2 dichloroethylene.

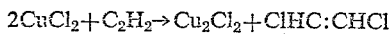

occurs in the liquid phase, advantageously at a temperature below about 150 C., preferably at about 60° C.–about 100° C. Application of pressure at correspondingly higher temperatures may also be employed. The range of pressure wherein the process of the present invention can be carried out has an upper limit at about 1.5 atmospheres gauge pressure, i.e. the highest pressure normally admissible for safety handling acetylene. The lower limit of the pressure range is at about 100 mm of mercury by gauge pressure. The dichloroethylene formed is distinguished by a high purity and boils at 48° C.

The cuprous-salt is reoxidized by oxygen or air in the presence of a hydrogen halide which may contain halogen as an impurity or it may be reoxidized by halogen or at an anode, for example, as follows:

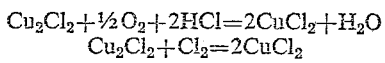

$Cu_2Cl_2 + 2HCl$ reoxidized at an anode$=2CuCl_2 + H_2$ and can then again be used for the preparation of ethylene dihalide.

The new process is fundamentally different from the hitherto known processes and shows a number of great advantages.

For example trans 1,2 dichloroethylene is obtained, as is known, only in he gaseous phase from chlorine and acetylene, while using a capillary or a narrow tube and applying a high temperature. As catalysts, glass, sand, iron, active carbon and the salts of iron, copper and barium in the solid state may be used in that case. The products formed contain, in addition to trans 1,2 dichloroethylene, also varying quantities of other chlorinated hydrocarbons, such as cis 1,2 dichloroethylene, 1,1 dichloroethylene, trichloroethylene, tetrachloroethane and others.

In the process according to the present invention, there is used, however, an aqueous solution of, for example, copper chloride as a catalyst, at a low temperature and preferably with hydrogen chloride which is introduced in the gaseous state or in the form of hydrochloric acid and which may also be rendered impure by the presence of chlorine. Copper acetylide and cuprous-chloride are prevented from precipitating by the presence of the free hydrochloric acid. Cupric-chloride acts as a chlorine carrier. The product formed is distinguished by a high purity and is obtained in a high yield due to a high activity of the catalyst.

The yield obtained in one passage of acetylene depends on the height of the contact column; in the case of preparing 1,2 trans dichloroethylene from acetylene it amounts to at least 75% of the acetylene introduced.

The height of the contact column is limited, if a tower is applied, by the admissible compression of the unsaturated hydrocarbon having a triple bond. It amounts to at most 12 meters, if 1.5 atmospheres (gauge pressure) are applied as admissible pressure for acetylene and the specific gravity of the contact solution is 1.3

It was surprising that cupric-chloride is well suited as a chlorine carrier, and that this new reaction can be advantageously carried out in an industrial scale.

It is evident that there exist considerable differences between the hitherto known methods of operating and the process of the present invention.

The advantages over the known processes consist in the following: instead of expensive chlorine, aqueous hydrochloric acid or hydrogen chloride which may even contain chlorine can be used for the preparation of dichloroethylene. Instead of mixtures of cis and trans ethylene dihalide, asymmetrical ethylene dihalide and other by-products, there is obtained the pure trans 1,2 ethylene dihalide. The liquid phase may now be used without the observation of special precautions, and explosions will not occur contrary to the preparation in the gaseous phase when acetylene and a halogen are used. An improved removal of heat is possible by the vigorous movement of the liquid phase, contrary to the known application of fixed solid catalysts. Finally, the yield is improved.

It is often difficult to utilize the large quantities of hydrogen chloride which are produced in many processes, in particular during organic chlorinations, since said quantities are industrially utilizable as hydrochloric acid only with a restricted radius of transfer and the hydrogen chloride frequently contains chlorine as an impurity additionally limiting the range of its utilization. Many attempts have already been made for preparing a reutilizable chlorine from hydrogen chloride, but these attempts have not been successful from an industrial point of view.

The reaction according to the present invention is a simple process of producing, on an industrial scale, chlorinated hydrocarbons from acetylene, while chlorine can completely or partially be dispensed with, by using hydrogen chloride in the gaseous state or dissolved in water. The use of cheap hydrogen chloride which may contain chlorine as an impurity or the use of aqueous hydrochloric acid, instead of the expensive chlorine, involves a great industrial importance:

(1) According to the aforedescribed reaction trans 1,2 dichloroethylene can be prepared from acetylene and hydrochloric acid, instead of using chlorine.

(2) The dichloroethylene so obtained can serve according to known processes, as starting material for the preparation of tetrachlorethane wherein, consequently only half of the chlorine bound originates from elementary chlorine, whereas the other half originates from hydrochloric acid.

(3) By a thermally splitting off HCl, the tetrachlorethane yields the important trichloroethylene wherein one third of the chlorine originates from cheap hydrochloric acid. Two mols of chlorine have hitherto been required for the preparation of 1 mol of trichloroethylene and 1 1 mol of HCl has been set free; by the new process, however, only 1 mol of chlorine and 1 mol of cheap hydrogen chloride are necessary.

(4) Finally, asymmetrical dichloroethylene (vinylidene chloride) which is of particular importance for the preparation of synthetic fibers can solely be prepared from acetylene and cheap hydrochloric acid by adding according to a known process the cheap hydrogen chloride in 1,2 position to the dichloroethylene prepared as described by (1), and splitting off hydrogen chloride from the 2,1 position of the trichloroethane formed.

It has thus become possible to utilize hydrochloric acid or hydrogen chloride or mixtures of hydrogen chloride and chlorine, which are obtained in many processes as worthless products, in a simple manner for the preparation of trans 1,2 dichloroethylene from acetylene.

The lower limit of the hydrochloric acid concentration to be applied in the contact solution is given by the solubility of the cuprous-chloride produced during the process and the upper limit is given by the boiling point of the azeotropic mixture of water and hydrogen chloride. These limits can be ascertained for everyone skilled in the art by mere observations since in the case of a low hydrochloric acid concentration the cuprous-chloride precipitates from the solution and in the case of a higher hydrochloric acid concentration than that aforesaid gaseous hydrogen chloride escapes from the contact solution into the gas cycle.

When trans 1,2 dichloroethylene is prepared from acetylene, the most advantageously applied hydrochloric acid concentration in the contact solution amounts, for example, from about 5 to about 6 mols per liter of contact solution, corresponding to a content of about 12% to about 18%. This acid concentration range, however may extend from 2.5 to 20%.

The content of cuprous-salt may vary within wide limits. The content according to the method of operating may vary between a molar proportion of cuprous-salt and cupric-salt from about 1:about 1 to about 9:about 1; this corresponds to a content of cuprous-salt of about 45% to about 90%. A preferred range is about 4:1 to about 9:about 1.

The following methods of operation are described hereafter, without, however, limiting the application thereto; they are illustrated, by way of example, in the accompanying diagrammatic drawings:

(1) The formation of the ethylene dihalide and the oxidation of the cuprous-salt may be performed continuously in two separate reaction vessels, for example, in the towers 1 and 2 of FIG. 1. The unsaturated hydrocarbon having a triple bond, for example acetylene, is caused to enter into the apparatus at 3 and is introduced, by way of a pump 4, a tube 5 and through a nozzle 6 into the tower 1. The tower 1 may be given the desired temperature by means of jacket 7. The tower 1 is filled, up to 8, with cupric-halide in aqueous, concentrated hydrogen chloride.

The reaction product, for example trans 1,2 dichloroethylene, is entered into a system of tubes 9, is conducted into a drying tower 10, which is filled, for example, with CaCl₂, and passed on to a heat exchanger 11. After the condensation is complete, it flows through a tube 12 into a supply vessel 13. The portions of the reaction product which have not taken part in the condensation in the heat exchanger 11 and which may consist, for example, of non-converted acetylene, are passed through tube 14 and re-introduced into the reaction cycle beginning at 3.

The contact solution consumed during the reaction in the tower 1, in which solution the cupric-halide is reduced to cuprous-halide, is passed through tube 15 and introduced with the aid of pump 16 into the reaction tower 2. The desired temperature can be maintained in the tower 2 by means of the jacket 17. The cuprous-halide which is present in the introduced contact solution is reoxidized by air, oxygen or chlorine so that cupric-halide is again produced. Air, oxygen or chlorine are introduced into the apparatus at 18 and are conveyed with the aid of a pump 19 and a nozzle 20 into the tower 2 which is filled up to 21 with the catalyst solution to be regenerated. The quantity of hydrogen chloride required for the regeneration of the contact solution leaves the supply vessel 23 in the form of a gas or as an aqueous, concentrated solution, passes the tube 22 and then enters the tower 2.

At 24, the regenerated contact solution leaves the tower 2, flows through the tube 25 and enters at 26 into the tower 1. Tower 2 can be deaerated by way of the tubes 27 and 28 and the cock 29.

By means of the apparatus described, it is possible continuously to react, for example acetylene, in the tower 1; in this case the contact solution used up is led away in the required manner through the tube 15 and in the regenerated form the quantity required is continuously let in through the tube 25.

It is also possible to operate discontinuously with the apparatus described herein. The procedure is as follows: the contact solution in tower 1 is reacted, for example, by the acetylene introduced until the bearable exhaustion has been reached. The supply of acetylene is then interrupted and the contact solution used up is regenerated as described above and then introduced into the tower 1. When the quantity required of the contact solution is again present in the tower 1, said tower can be supplied again with acetylene.

It is also possible to carry out the reaction as follows: The conversion of, for example acetylene into trans 1,2 dichloroethylene and the regeneration of the contact solution are carried out simultaneously, for example in the reaction tower 1. In that case the tubes 15 and 25 are omitted and in the reaction tower 1 a tube 30 is mounted which ends in a nozzle and serves for the introduction of the gases required for the oxidation, such as air, oxygen or chlorine; furthermore a tube for the introduction of hydrogen halide is necessary (similarly to tube 22 and supply vessel 23, described above).

Figure 2:
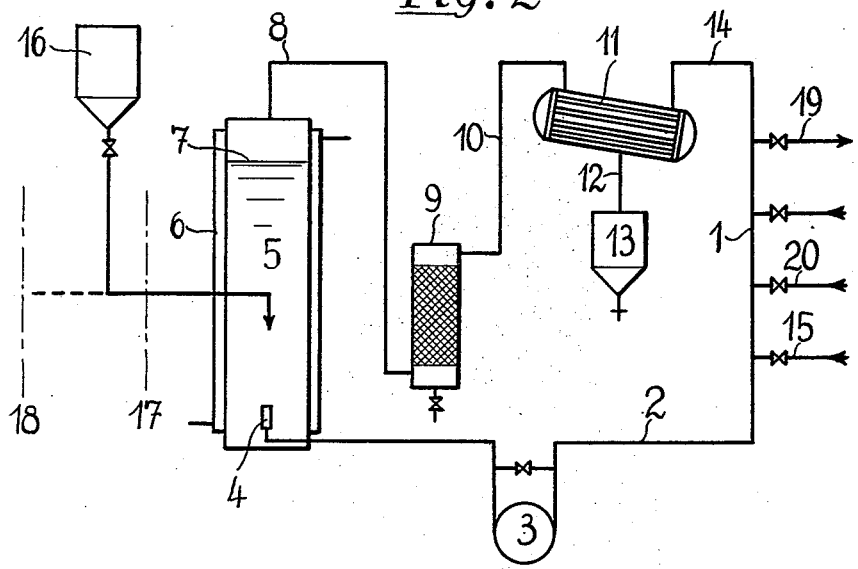

Another method of operating is illustrated in FIG. 2 of the accompanying drawing.

Acetylene, for example, is introduced at 1 into the tube 2 and passed with the aid of pump 3 and nozzle 4 into the reaction tower 5 which is tempered by the jacket 6.

In the reaction tower 5 is contained a contact solution which consists of aqueous concentrated hydrogen halide and the cupric-halide corresponding to the hydrogen halide. The tower 5 is filled up to 7 with the contact solution.

The reaction products, for example trans 1,2 dichloroethylene, are passed through the tube 8 and then introduced into a drying tower 9 which is filled, for example with CaCl₂. The products are then passed through the tube 10 and conveyed to the heat exchanger 11 from which the condensed trans 1,2 dichloroethylene flows through the tube 12 into the supply vessel 13. The portion of acetylene which has not been reacted and which is admixed to the dichloroethylene formed during the reaction, is not condensed in the heat exchanger 11, but flows through the tube 14 again into the reaction tower 5.

When the catalyst solution has been used up, the introduction of acetylene is stopped and the apparatus is blown through with nitrogen which enters through pipe 20. Following this, oxygen or some other gas capable of oxidation is introduced at 15, and, as described above, reaches the reaction tower 5 over 2, 3 and 4 in a manner analogous to that described above and introduced into the reaction tower 5 where the contact solution is regenerated; at the same time the hydrogen halide required for the regeneration of the contact solution is caused to leave the supply vessel 16 in the gaseous or aqueous, concentrated form and introduced into the reaction tower 5.

After the catalyst solution has been regenerated and the apparatus has been blown through via 20 with nitrogen, the above described reaction is started again while introducing, for example, acetylene.

The apparatus situated on the right-hand side of the plane given at 17 is once more present specularly on the left-hand side of the plane given at 18; the process can, therefore also be effected as follows: in the devices mounted on the right-hand side of 17 and on the left-hand side of 18 the aforedescribed reaction and the regeneration of the contact solution can take place alternately.

The apparatus can be exhausted at 19.

If pressure is applied the procedure is as follows: A mixture, a suspension or an emulsion of aqueous cupric-salt solution containing hydrogen halide and the ethylene dihalide already obtained is first introduced into the apparatus and acetylene and hydrogen halide are then conducted into said mixture.

Finally an intimate contact between the liquid catalyst and acetylene or oxygen and hydrogen chloride may be attained by using trickling towers, injectors, turbomixers, vessels provided with stirrers and similar devices.

In general, there will be operated by the following continuous process: In the first apparatus (see tower 1 of FIG. 1) acetylene is acted for example on cupric-chloride in a hydrochloric acid solution at a temperature between 60° C. and 150° C., if required with application of atmospheric (gauge) pressure. During the reaction the trans 1,2 dichloroethylene is separated from the non-converted acetylene by cooling, whereas in the second apparatus (tower 2) the cuprous-chloride solution formed is oxidized again with air, oxygen or at an anode, while adding hydrochloric acid, so that cupric-chloride is obtained. The contact solution is pumped in a cycle through both devices in such a manner that the oxidized solution is continuously introduced into the first apparatus and the reduced solution is continuously introduced into the second apparatus. In order to improve the fixation and activation of the acetylene, a certain cuprous-conent is maintained in the first apparatus wherein the oxidized solution is taken up. The non-converted acetylene is mixed in a cycle with a fresh quantity of acetylene and reintroduced into the first apparatus.

It is possible to apply the process of the present invention also to other unsaturated triple bond hydrocarbons, for example, to monovinyl-acetylene.

The following examples serve to illustrate the invention, but they are not intended to limit it thereto:

*Example 1*

In a reaction tower containing a contact solution of the following composition: 0.63 mol CuCl per liter, 1.39 mol $CuCl_2$ per liter (i.e., a ratio of cuprous/cupric=0.45:1)

and 5.0 mol HCl per liter, there were circulated 50 l. of acetylene at 91° C. and 764 mm. Hg gauge pressure per hour. The molar ratio of cuprous/cupric set in the beginning at 0.45:1 was maintained by adding through pumping into the contact solution a cupric chloride solution and correspondingly drawing off the dissipated contact solution. Altogether 53 l. acetylene were converted and thereby 170 g. pure trans 1,2 dichloroethylene were obtained. The yield relative to acetylene was 75%; the contact-efficiency was 21 g. dichloroethylene per liter contact solution and per hour.

*Example 2*

Into a reaction tower 2 liters of a contact solution were introduced containing 1.15 mol cuprous-chloride, 3.31 mol cupric-chloride and 1.01 mol HCl per liter contact solution. At a contact temperature of +65° C. and an overpressure of 200 mm. Hg-column about 40 liters of acetylene per liter contact solution per hour were passed through the reaction tower. The cuprous-chloride:cupric-chloride molar ratio of 0.35:1 set at the beginning was maintained by continuously adding regenerated contact solution through a pump and correspondingly drawing off of the used-up contact solution. 100.5 liters of acetylene was consumed over a three hour period while 348 g. of 1,2 dichloroethylene were produced. Relative to the acetylene used, the yield amounted to about 80%. The contact performance was 58 g. 1,2 dichloroethylene per liter contact solution and per hour.

*Example 3*

In a reaction tower containing a contact solution of the following composition: 0.95 mol CuCl per liter, 1.05 mol $CuCl_2$ per liter (i.e. a ratio of cuprous/cupric=0.9:1.0)

and 5.7 mol HCl per liter, there were circulated 50 l. of acetylene at 90° C. and 760 mm. Hg gauge pressure per hour. The cuprous/cupric molar ratio set in the beginning at 0.9:1.0 was maintained as described in Example 1. Altogether 94 l. acetylene were converted and 327 g. pure trans 1,2-dichloroethylene were obtained. The yield relative to acetylene was 81%; the contact-efficiency was 33 g. dichloroethylene per liter contact solution and per hour.

*Example 4*

In a reaction tower of 2 l. volume there was present a contact solution of the following composition: 1.09 mol CuCl per liter, 0.80 mol $CuCl_2$ per liter (i.e. a ratio of cuprous/cupric=1.36:1)

and 5.6 mol HCl per liter. In this solution 50 l. of acetylene were circulated at 90° C. and at 765 mm. Hg gauge pressure per hour. The molar ratio of cuprous/cupric set in the beginning at 1.36:1 was maintained as described in Example 1. Altogether 50 l. acetylene were converted and 185 g. pure trans 1,2 dichloroethylene were obtained. The yield relative to acetylene was 86%; the contact efficiency was 26 g. dichloroethylene per liter contact solution and per hour. The reduced contact efficiency is explained here by the reduced total copper concentration in the solution.

*Example 5*

Two liters of a contact solution of the following composition were filled into a reaction tower: cuprous-chloride: 1.9 mol per liter, cupric-chloride: 1.06 mol per liter and HCl: 5.5 mol per liter. The cuprous-chloride:cupric-chloride molar ratio is 1.8:1. Into this solution about 60 liter acetylene per liter contact solution were introduced per hour at +80° C. and an over pressure of 300 mm. Hg-column, whereby the cuprous:cupric molar ratio set at the beginning was maintained by continuously adding regenerated contact solution and correspondingly drawing off the used-up contact solution. 145 liters of acetylene were consumed over a three hour period where 576 g. of 1,2 dichloroethylene were produced. Relative to the acetylene used, the yield was 92%. The contact performance was 96 g. 1,2 dichloroethylene per liter contact solution and per hour.

*Example 6*

In a reaction tower there was present a contact solution of the following composition: 1.47 mol CuCl per liter, 0.50 mol $CuCl_2$ per liter (i.e. a cuprous/cupric ratio=2.94:1)

and 5.6 mol HCl per liter. In this solution 50 l. of acetylene were circulated at 85° C. and at 758 mm. gauge Hg pressure per hour, whereby the cuprous/cupric ratio set in the beginning at 2.94:1 was maintained as described in Example 1. Altogether 92 l. acetylene were converted and thereby 381 g. pure trans 1,2 dichloroethylene were obtained. The yield relative to acetylene was 95%; the contact efficiency was 43 g. dichloroethylene per liter contact solution and per hour.

*Example 7*

100 l. of acetylene were introduced at about 85° C. under a pressure of about 250 mm. of mercury into a reaction tower which contains 170.5 grams=1 mol of $CuCl_2.2H_2O$ and 396 grams=4 mols of CuCl in 2000 grams of a hydrochloric acid of 20% strength. A cupric-chloride solution pumped into the apparatus and the contact solution consumed is drawn off; a molar ratio of about 4:about 1 of cuprous/cupric was thus adjusted. 420 grams of pure trans 1,2 dichloroethylene boiling at 48° C. were obtained. The yield calculated upon the acetylene converted amounts to 97% and the capacity of the catalyst was about 102 grams of dichloroethylene per liter of catalyst an hour.

*Example 8*

100 l. of acetylene were introduced at about 90° C. under a pressure of about 300 mm. of mercury into a reaction tower which was charged with a contact solution containing 1.90 mols of CuCl, 0.24 mol of $CuCl_2$ and about 5.6 mols of HCl per liter of catalyst. By a continuous addition by pumping of a cupric-chloride solution in hydrochloric acid and drawing off of the reduced contact solution, a molar ratio of about 8:about 1 of cuprous/cupric were maintained. 430 grams of a reaction product were obtained which boiled at 48° C. and 99.6% of which consisted of trans 1,2 dichloroethylene. The yield calculated upon acetylene converted amounted to 99%; the capacity of the catalyst was 115 grams of ethylene dichloride per liter of catalyst an hour.

The reduced copper chloride solution was oxidized in a further tower with 260 l. of air, while adding 1000 grams of an aqueous hydrochloric acid of 30% strength and then reintroduced into the first tower. The water which was carried over was distilled off.

The contact performance, that is the quantity of the formed dichloroethylene, per liter contact solution per hour does not depend only upon the molar ratio cuprous chloride/cupric chloride, but also upon the total concentration of the copper. At a given molar ratio cuprous chloride/cupric chloride and a given HCl concentration, the maximum total concentration of copper is nearly entirely fixed by the solubility of the cuprous-chloride. At the same total content of copper, the contact solutions with a lower molar ratio cuprous chloride/cupric chloride contain of course less cuprous-chloride than at a correspondingly higher molar ratio. So in those cases with constantly lower molar ratio, the total concentration of copper can be increased without any difficulty as explained in the description and examples corresponding to the solubility of cuprous-chloride. In this manner, lower contact performances obtained at contact solutions with a constant total concentration of copper, while the cuprous chloride/cupric chloride molar ratio is decreasing, can be compensated, that is, they can be increased again. Finally the methods with the cuprous chloride/cupric chloride molar ratio of 1:1 to 4:1 and the methods with a molar ratio of only 4:1 to 9:1 then can be considered equal.

To state the above proposition in another way, the amount of 1,2 dichloroethylene produced is dependent on the molar ratio of cuprous chloride/cupric chloride on the one hand and the total amount of copper present in the contact solution, on the other hand; and that the higher the cuprous chloride/cupric chloride the better the process on the one hand and the higher the total amount of copper the better the process on the other hand. Consequently, a relatively small cuprous chloride/cupric chloride ratio, say, 1:1 together with a high total amount of copper may give the same results as likewise does: a relatively great cuprous chloride/cupric chloride ratio, say, 9:1 together with a low total amount of copper.

Obviously many modifications and variations of the present invention are possible in the light of the above teachings. It is, therefore, to be understood that within the scope of the appended claims the invention may be practiced otherwise than as specifically described.

What is claimed is:

1. A process for producing trans-1,2-dichloroalkene which comprises introducing an unsaturated aliphatic hydrocarbon having at least one triple bond into a solution consisting of cuprous chloride, cupric chloride, and about 2.5 to about 20% of hydrogen chloride, the molar ratio of cuprous chloride to cupric chloride being at least 1:1, said solution having a mol total copper content of 1.3 to 5 mol per liter of contact solution, said solution being maintained at a temperature of about 60 to 150° C., and recovering resulting trans-1,2-dichloroalkene.

2. The process of claim 1 wherein the molar ratio of cuprous chloride to cupric chloride in the reaction mixture is from about 4:1 to about 9:1.

3. The process of claim 1 wherein the reaction is carried out under a pressure of between about 100 mm. of mercury gauge pressure and about 1.5 atmospheres gauge pressure.

4. The process of claim 1 wherein aqueous hydrogen chloride is used.

5. The process of claim 1 wherein the reaction is carried out in two reaction zones and includes the steps of introducing the unsaturated aliphatic hydrocarbon into liquid solution in one of said zones to form the trans-1,2-dichloroalkene as well as to convert the cupric chloride in the solution to cuprous chloride, pumping the reduced liquid solution into the second of said zones, reoxidizing the cuprous chloride in said solution while it is in the second of said zones, and returning the reoxidized solution to the first of said zones, the entire process taking place in a continuous manner.

6. The process of claim 1 wherein said unsaturated aliphatic hydrocarbon is acetylene.

7. A process for producing trans-1,2-dichloroalkene which comprises introducing an unsaturated aliphatic hydrocarbon having at least one triple bond into a liquid solution consisting of cuprous chloride, cupric chloride, and about 2.5 to about 20% of hydrogen chloride, the molar ratio of cuprous chloride to cupric chloride being at least 1:1, said solution having a mol total copper content of 1.3 to 5 mol per liter of contact solution, said solution being maintained at a temperature of about 60 to 100° C., and recovering resulting trans-1,2-dichloroalkene.

8. A process for producing pure trans-1,2-dichloroethylene which comprises introducing acetylene into a solution consisting of cuprous chloride, cupric chloride and about 12 to 18% aqueous HCl, the molar ratio of cuprous chloride to cupric chloride being about 4:1 to about 9:1, said solution having a mol total copper content of 1.3 to 5 mol per liter of contact solution, said solution being maintained at a temperature of about 60 to 100° C., carrying out the reaction under a pressure of between 100 mm. of Hg gauge pressure and about 1.5 atmospheres gauge pressure, and recovering resulting trans-1,2-dichloroethylene.

References Cited in the file of this patent

UNITED STATES PATENTS 2,440,997    Alder _____ May 4, 1948
2,809,221    Thomas et al. _____ Oct. 8, 1957

FOREIGN PATENTS

Nieuwland et al.: Proc. Indiana Acad. of Science, 38, 196 (1929).

Nieuwland: "Industrial and Engineering Chemistry," vol. 27, pp. 850–854 (1935).